128,359

UNITED STATES PATENT OFFICE.

WILLIAM H. BUTLER, OF NEW YORK, N. Y.

IMPROVEMENT IN LINING OR FILLING FIRE-PROOF SAFES.

Specification forming part of Letters Patent No. 128,359, dated June 25, 1872.

*To whom it may concern:*

Be it known that I, WILLIAM H. BUTLER, of the city, county, and State of New York, have invented a new and useful Improvement in the Lining or Filling of Fire-Proof Safes.

The nature of my invention consists in the structure and quality of the lining, whereby the outer and inner walls of iron, holding the filling, are not after use oxidized and rendered brittle; a lining which adds strength to the safe, and also contains sufficient water of crystallization to reduce the temperature on exposure to heat, and which is a dry lining, preserving books, parchment, and other valuables from molding. It also in a degree absorbs the vapor within the capillary spaces of the portion forming the inner part of the lining when that forming the outer part has been highly heated, so that in case of prolonged fire or heating the inner wall is reached, the vapor still further reduces the temperature; also a lining at less cost which more effectually attains the objects desirable in a filling.

Safes have been constructed by filling the walls with calcined plaster of Paris, mixed with water sufficient to set or solidify it in a short time. Hydraulic cement, mixed with water, has been used. Asbestus, dry, has also been employed as a filling for safes; also shales and other earths, consisting chiefly of silicate of magnesia, as soap-stone. The objection to the former of these was that it rusted or corroded the iron rapidly, rendering it brittle and easily broken, while it was always so damp that books become moldy when confined within the safe. The latter class of filling had not the advantage of holding water of crystallization to reduce temperature in case of fire. Next came a system of mixing salts holding a large percentage of water of crystallization with dry pigments, as alum, sulphate of alumina and of potash, and soda alum with calcined clay—the same with calcined plaster of Paris. Sulphate-of-iron crystals with both clay and plaster have been used. These are all more expensive than mine, while they add no strength or solidity to the safe.

In the construction of safes by my new method I proceed to build the walls of iron in the ordinary manner; but instead of filling the space between the inner and outer walls with either of the fillings heretofore practiced—consisting of a mixture, without order, of pigments and salts holding water of crystallization—I construct three distinct walls or layers, for example, by dividing the space into three equal divisions of about one and two-thirds inches each. This is accomplished by boards of such thickness. Two of these are adjusted next to the inner wall, thus leaving the outer space open. This space I fill with hydraulic cement dampened sufficiently to make it set. When this is completed I remove the inner board, and pack the space with dry paper fiber prepared from paper pulp saturated with alum, by soaking it previously in alum-water and afterward drying it. On the completion of this division I remove the middle board and fill the space between the two walls I have described with a mixture of calcined gypsum or sulphate of lime, or sulphate of baryta, dry, and either separate or combined the following sulphates, which hold a large percentage of water of crystallization, namely: Sulphate of alumina and of potash, $KO,SO_3$; $Al_2O_3,SO_3+24HO$. Sulphate of alumina and of soda, $NaO,SO_3$; $Al_2O_3,SO_3+24HO$. Sulphate of alumina and of ammonia, $NH_4O,SO_3$; $Al_2O_3,3SO_3+24HO$. Sulphate of alumina and of protoxide of iron, $FeO,SO_3$; $Al_2O_3,3SO_3+24HO$. Sulphate of alumina and of manganese, $MnO_3,SO_3$; $Al_2O_3,3SO_3+25HO$. Sulphate alumina and of magnesia, $MgO,SO_3,Al_2O_3,3SO_3+25HO$. Sulphate of alumina and of zinc, $ZnO,SO_3$; $Al_2O_3,3SO_3+24HO$. Sulphate of alumina, normal, $Al_2O_3,3SO_3+18HO$. Sulphate of iron, $FeO,SO_3+7HO$. Sulphate of soda, $NaO,SO_3+10HO$.

These salts may be all used in varying proportions in combination with calcined sulphate of lime, or dry sulphate of baryta, or a mixture of these.

I prefer the proportion of three parts of the salts or alums to one part of the calcined gypsum, by weight. The salts are granulated to about the size of hazel-nuts, thoroughly mixed with the sulphate of lime, and firmly packed, as above described.

I will here remark that I have employed dry asbestus fibers in place of paper fibers, for the inner partition or wall. Asbestus absorbs water and moisture, answering the purpose well. I prefer, however, the paper fibers, as they absorb moisture better, and are lighter.

The whole combination constitutes a filling possessing the qualities set forth in the preceding part of this description. The outer wall gives strength to the whole structure, does not materially rust the iron, while at the same time it is a good non-conductor of heat. The middle wall is a good non-conductor of heat, and holds water of crystallization which at varying temperatures is liberated to form vapor for reducing the temperature. The inner wall is one of the best non-conductors of heat, perfectly dry, and in case of fire is an absorbent of the vapor evolved from the middle section, so that as the temperature, in case of prolonged heating, extends inwardly, the water is redispersed, acting still further to retard the heat.

Having thus described my invention, what I claim, and desire to secure by Letters Patent of the United States, is—

A filling for fire-proof safes, composed of three or more layers or stratums, arranged substantially as herein described, so that the vapor-producing materials shall be inclosed between a strong outer shell or stratum of non-conducting material and an inner shell or stratum of fibrous or absorbent material, as set forth.

W. H. BUTLER.

Witnesses:
J. M. TIGHE,
D. D. PARMLEE.